US011068948B1

(12) United States Patent
Hanna

(10) Patent No.: US 11,068,948 B1
(45) Date of Patent: Jul. 20, 2021

(54) INTELLIGENT FOOD SERVICE STATION SYSTEM

(71) Applicant: Nader G. Hanna, Huntington Beach, CA (US)

(72) Inventor: Nader G. Hanna, Huntington Beach, CA (US)

( * ) Notice: Subject to any disclaimer, the term of this patent is extended or adjusted under 35 U.S.C. 154(b) by 12 days.

(21) Appl. No.: 16/520,163

(22) Filed: Jul. 23, 2019

Related U.S. Application Data

(60) Provisional application No. 62/702,290, filed on Jul. 23, 2018.

(51) Int. Cl.
| | |
|---|---|
| *G06Q 20/18* | (2012.01) |
| *G01G 19/414* | (2006.01) |
| *G01G 19/52* | (2006.01) |
| *G05B 15/02* | (2006.01) |
| *G06Q 30/02* | (2012.01) |

(52) U.S. Cl.
CPC ..... *G06Q 30/0283* (2013.01); *G01G 19/4144* (2013.01); *G01G 19/52* (2013.01); *G05B 15/02* (2013.01); *G06Q 20/18* (2013.01)

(58) Field of Classification Search
CPC ............... G06Q 30/0283; G06Q 20/18; G01G 19/4144; G01G 19/52; G05B 15/02
USPC ........................................................ 177/25.1
See application file for complete search history.

(56) References Cited

U.S. PATENT DOCUMENTS

| | | | | |
|---|---|---|---|---|
| 6,982,388 | B2 * | 1/2006 | Kasinoff | G01G 19/4144 177/2 |
| 7,597,254 | B2 * | 10/2009 | Miller | G01G 23/3728 235/378 |
| 7,720,711 | B2 | 5/2010 | Taylor | |
| 8,304,668 | B2 * | 11/2012 | Collins | G06Q 20/209 177/25.13 |
| 2003/0163388 | A1 * | 8/2003 | Beane | G06Q 20/18 705/26.1 |
| 2006/0038008 | A1 * | 2/2006 | Miller | G01G 23/3728 235/383 |
| 2018/0103778 | A1 | 4/2018 | Olovsson | |

FOREIGN PATENT DOCUMENTS

| | | | | |
|---|---|---|---|---|
| CN | 2013050810 | * | 4/2013 | ............ G06F 17/60 |
| CN | 104021506 A | | 9/2014 | |
| CN | 105046815 A | | 11/2015 | |
| CN | 109584480 | * | 4/2019 | ........... G01G 19/414 |
| CN | 210533524 | * | 5/2020 | ............. G01G 19/40 |

(Continued)

*Primary Examiner* — Jacques M Saint Surin
(74) *Attorney, Agent, or Firm* — Plager Schack LLP; Mark H. Plager; Michael J. O'Brien

(57) ABSTRACT

A self-service retail food station is configured to enable a patron to select and serve themselves food selections from a plurality of disparately priced foods, priced by weight. the self-service retail food station has at least one intelligent food service pan joined to a weight scale and containing food for service therein. A data controller is communicatively coupled to the weight scale and configured to measure adjustments on the weight scale. A tracking device is programmed with an integrated software application containing instructions to identify the patron who owns the mobile device. Then, communicate with the data controller as to a weight adjustment caused by the patron. Finally, present the patron a final price for payment.

6 Claims, 1 Drawing Sheet

(56) References Cited

FOREIGN PATENT DOCUMENTS

| DE | 102011014839 | * | 9/2012 | ............. | G06Q 30/06 |
| DE | 10204201136 | * | 8/2015 | ............. | G06Q 50/12 |
| KR | 101721361 | B1 | 3/2017 | | |

* cited by examiner

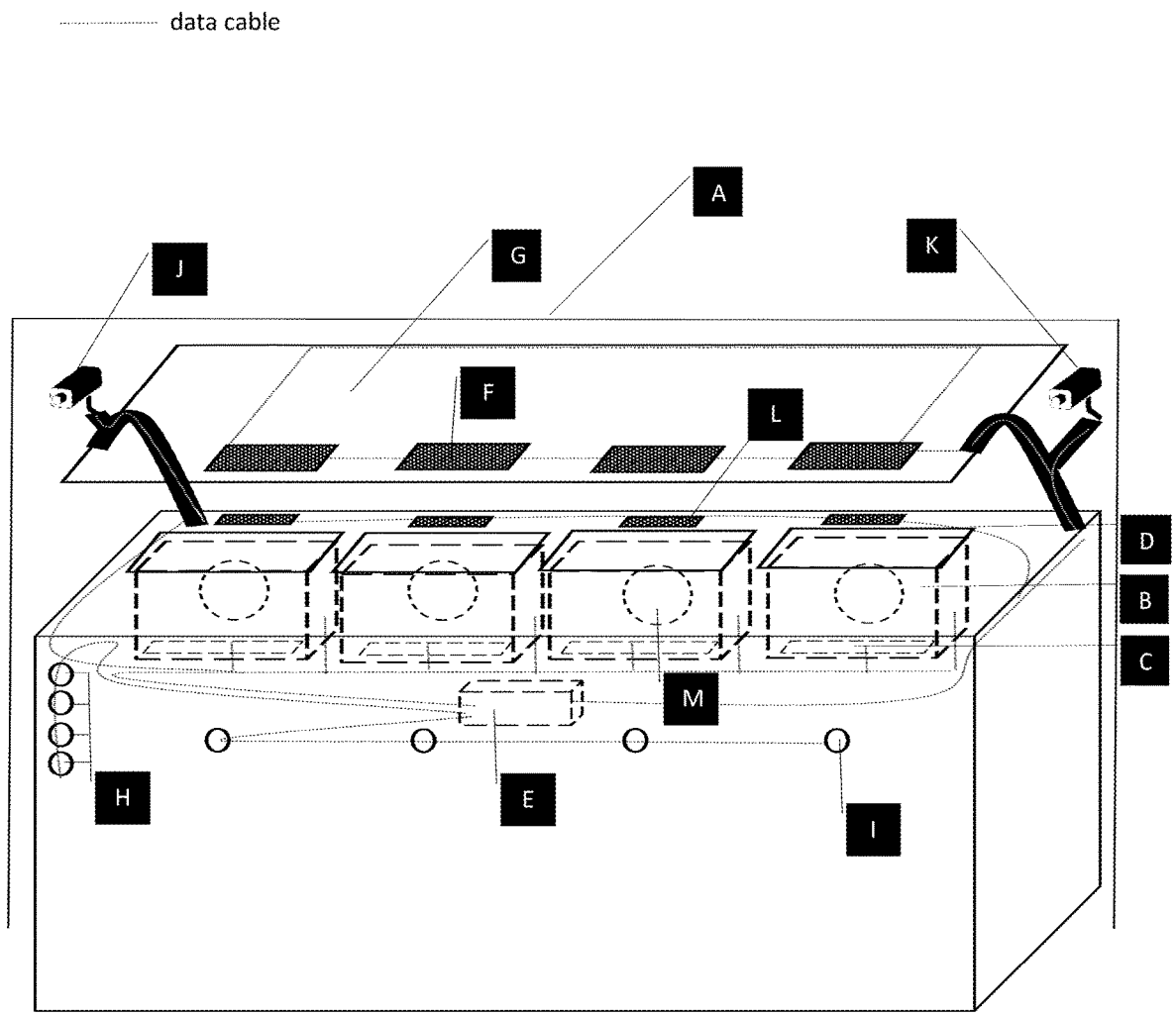

US 11,068,948 B1

INTELLIGENT FOOD SERVICE STATION SYSTEM

RELATED APPLICATION

This application claims priority to provisional patent application U.S. Ser. No. 62/702,290 filed on Jul. 23, 2018.

BACKGROUND

The embodiments herein relate generally to systems for retail food service.

A few trends in retail food service are 1. labor shortages and excessive expense for labor, in what has become a very competitive industry, 2. greater fluctuations in demand due to online delivery services and 3. growth in "fast casual" dining, as people seem to want to get served faster, with food quality that exceeds fast food. A technology developed to enable people who are inclined to fast casual to serve themselves from a food station could mitigate labor requirements. This self-service technology could further use the latest technology, including artificial intelligence, to anticipate and respond to demand. Cooking is managed to serve multiple guests with anticipated demand learned by such artificial intelligence, instead of cooking to each order individually. And as a self-service technology, the speed of service is increased as the food is ready to serve, so that patrons are not forced to order and wait for their specific order, but rather, take what they want. Furthermore, food that has sat too long in warming pans or in cold trays is subject to oxidation, so technology must be employed to ensure quality is on par with fast casual dining, where food is made to order.

SUMMARY

A self-service retail food station is configured to enable a patron to select and serve themselves food selections from a plurality of disparately priced foods, priced by weight. the self-service retail food station has at least one intelligent food service pan joined to a weight scale and containing food for service therein. A data controller is communicatively coupled to the weight scale and configured to measure adjustments on the weight scale. A tracking device is programmed with an integrated software application containing instructions to identify the patron who owns the mobile device. Then, communicate with the data controller as to a weight adjustment caused by the patron. Finally, present the patron a final price for payment.

BRIEF DESCRIPTION OF THE FIGURES

The detailed description of some embodiments of the invention is made below with reference to the accompanying figures, wherein like numerals represent corresponding parts of the figures.

FIG. 1 shows a schematic view of one embodiment of the present invention.

DETAILED DESCRIPTION OF CERTAIN EMBODIMENTS

An intelligent food service station (IFSS) system and components enables cooks to respond to multiple demand signals for prepared food replenishment. Digital video and/ or photos capture patrons as they enter the establishment and are in line at the food station, and through programmed instructions and artificial intelligence in response to learned patron profiles, prepared, ready-to-serve food production requirement signals are sent to cooking staff, including types and quantity (by weight) of food as reconciled with prepared food on hand.

Furthermore, patrons serve themselves without the need of any service staff. The IFSS system and components 1. track and monitor patrons as they move in line, serving themselves from serving pans and 2. enables an automated final charge to patrons for self-service of disparately priced foods, priced by weight, finalizing the transaction payment with one of: a swipe of a credit card, interaction with an online application tracking their food purchase, or by an electronic payment service, of which payment is performed by the patron without a cashier.

The main components of the IFSS are the Intelligent Food Service Pan "IFSP" and Weight Scale or "scale". The IFSP stores prepared, ready-to-serve, hot or cold food, and when a serving is taken by a patron, the scale decrements the serving weight from the prior weight, and then registers the decremented weight and resulting charge to the respective patron. This process is repeated for each serving taken by a patron down the line for a running total, conveyed to them by means of displays located in proximity to each IFSP. The IFSS system further includes a consumer application accessible via the Internet for patrons who want a membership and related food offerings presented to them.

IFSP's, Scales and Displays and Integration with Data Controller

The IFSP's are located in the IFSS serving unit and the scales are positioned beneath them. Each IFSP contains within its interior where food is placed, the components of: a temperature sensor, temperature controls, moisture sensor, pressure sensor, pH sensor and a volume sensor (measuring how high up the food goes in the IFSP, so when combined with weight data, can yield a density) which are located on an at least one interior surface in order to make direct contact with food. Both the IFSP and scale are data linked and integrated to a Data Controller or DC. The DC is a computing device fitted with the necessary connections to the IFSP components and to the scale, to receive data inputs from IFSP sensors and changing weight of the IFSP as recorded by the scale. All the above stated sensor, as received by the DC, hereafter referred to as "pan data." The IFSP temperature controls can be adjusted by the DC in response to IFSS system requirements. Each IFSP further contains one or more displays associated with it, placed in the back of each IFSS unit for viewing by cooking staff which detail production requirements for replenishment associated with demand signals.

IFSS Tracking Components and Integration with DC

The patrons are tracked by an interaction between:
1. at least one of: their person, by their mobile telephone, a personal digital electronic device, and a temporarily given EM emitting device hereafter referred to as "identifiers", which interact with
2. at least one of: digital video, cameras, sensors, beacons or any EM wave emitting device, hereafter referred to as "monitoring devices" which are located on or near the IFSS.

The tracking enables a patron's relative place in line and the respective IFSP they are serving themselves from to register the weight of any serving taken, which is further registered to their price total and stored by the DC. The final transaction is totaled, and payment is elicited by at least one of: an application on their mobile phone, a touch screen at the end of the line or a point at the end of the line, that once they pass, alerts payment, and where passing a final end point at the IFSS unit without a payment transaction, sounds an alarm. The DC is further integrated by data cables or wirelessly to digital displays which are located for convenient viewing by patrons at the IFSS service unit, so they are apprised of item pricing, weight and the respective price of a serving taken. The patron displays are in proximity to the respective IFSP, as in located on the sneeze guard above, and are data linked to each other and to the DC so as the patron advances, their running total is conveyed by the displays. The IFSS further contains thermometers, hygrometers, barometers, ionic sensors and any other ambient condition measuring devices, hereafter referred to as "AD's", which data is acquired from and is also propagated to the DC for rules-based food replacement and temperature adjustment associated with food quality The DC The DC contains programmed instructions and artificial intelligence to interact with and optimize where necessary, all the IFSS system and components, and is further accessible via a global computer network. The DC processes and responds to data specifically associated with pan data, monitors, identifiers, AD's, point of sale and online orders. The DC is further interconnected to the facility in which it resides where it can control and optimize heating, ventilation, air conditioning, de-ionization and dehumidification associated with the facility. In addition to ambient conditions, the DC will retrieve whether conditions from the Internet and further store whether as a data point used in artificial intelligence.

IFSS Camera Component and DC Artificial Intelligence

For cooking staff to respond to demand signals other than the weight of food decremented from IFSP's, the patrons will be digitally recorded and/or photographed as they enter the store and/or are in line at the IFSS. The DC will receive such video and/or photos of patrons and process such data, through programmed instructions and/or artificial intelligence including such patron profiles as: the numbers of patrons entering the restaurant or are in line at the IFSS, a recognized customer and their profile contained within a patron-user application, the age or age range, sex, body language, facial expressions, body motion, ethnicity, dress, numbers in a group and "mass profiles" of patrons, which includes the relative size of patrons as a captured image from multiple dimensions for a volume designation. Such patron profiles hereafter referred to as "numbers and attributes". Such data related to numbers and attributes will be further processed with programmed instructions and artificial intelligence to learn expected demand requirements including types of food and quantity by weight. Demand requirements are propagated as signals to cooking staff through their displays located behind the IFSS unit. Such demand signals are further reconciled with existing food ready for service, including types of food and quantities, contained at the IFSP's. As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A self-service retail food station, configured to enable a patron to select and serve themselves food selections from a plurality of disparately priced foods, priced by weight, the self-service retail food station comprising:
   at least one intelligent food service pan joined to a weight scale and containing food for service therein;
   a data controller, communicatively coupled to the weight scale and configured to measure adjustments on the weight scale;
   a mobile device, communicatively coupled to the tracking device
   a tracking device, programmed with an integrated software application containing instructions to:
   identify the patron who owns the mobile device;
   communicate with the data controller as to a weight adjustment caused by the patron; wherein the weight adjustment consists of one member of the weight adjustment set consisting of adding a food item to the weight scale and removing the food item from the weight scale and
   present the patron a final price for payment.

2. The self-service retail food station of claim 1, further comprising:
   a location tracking circuit, electrically coupled to the tracking device; wherein the tracking device is further programmed with instructions to determine that the patron has beyond access to any food service trays, indicating a completion of their food selections for payment.

3. The self-service retail food station of claim 2, further comprising:
   a food service tray, joined to the tracking device and configured to accommodate the food selections.

4. The self-service retail food station of claim 1, further comprising:
   a buffet, accommodating the at least one intelligent food service pan;

a sneeze guard, joined to the buffet and arranged over the at least one intelligent food service pan;

at least one display screen arranged above sneeze guard and above each intelligent food service pan, wherein the at least one display screen is programmed with instructions to:

identify a closest customer apprise the closest customer of a food type in the intelligent food service pan, apprise the closest customer of a food cost by weight, apprise the closest customer of an amount of food served from the intelligent food service pan, communicate to the data controller a respective amount of food served and a running cost of food removed from the intelligent food service pan.

5. The self-service retail food station of claim 1, wherein the data controller is further programmed with instructions to:

determine a quantity and a type of the food needed to fulfill a customer demand, wherein the customer demand is determined by real time video taken of patrons prior to self-service of food items, for analysis with historical video data to correlate to purchasing data communicate the quantity and the type of food to cooking personnel.

6. The self-service, retail food station, as in claim 1, further comprising hot and cold food service trays, wherein the hot and cold food service trays contain sensors and are programmed with instructions to control temperature for optimized food quality in response to food moisture, food acidity and ambient conditions.

* * * * *